(12) United States Patent  (10) Patent No.: US 6,874,250 B2
Prajescu et al.                 (45) Date of Patent: Apr. 5, 2005

(54) CLOTHES DRYER

(75) Inventors: Silvia Prajescu, Dollard des Ormeaux (CA); Serena Hum, Montreal (CA)

(73) Assignee: Camco Inc., Mississauga (CA)

( * ) Notice: Subject to any disclaimer, the term of this patent is extended or adjusted under 35 U.S.C. 154(b) by 0 days.

(21) Appl. No.: 10/626,687

(22) Filed: Jul. 25, 2003

(65) Prior Publication Data

US 2005/0016015 A1    Jan. 27, 2005

(30) Foreign Application Priority Data

Jul. 3, 2003    (CA)    ................................ 2434354

(51) Int. Cl.[7] ........................ F26B 11/02; F26B 21/00
(52) U.S. Cl. ........................ 34/606; 34/604; 34/524; 34/121; 34/605
(58) Field of Search ........................ 34/318, 499, 108, 34/605, 606, 604, 595, 524, 121, 122, 124, 34/125, 565, 119, 555, 261, 312

(56) References Cited

U.S. PATENT DOCUMENTS

| 4,147,070 A | 4/1979 | McMillan |
| 4,300,293 A | 11/1981 | Gladysz |
| 4,360,977 A | 11/1982 | Frohbieter |
| 4,407,077 A | 10/1983 | Smith |
| 4,677,761 A * | 7/1987 | Rattner ..................... 34/108 |
| 4,700,492 A | 10/1987 | Werner et al. |
| 6,647,643 B2 * | 11/2003 | Song et al. ................ 34/595 |

* cited by examiner

Primary Examiner—Kenneth Rinehart

(57) ABSTRACT

A clothes dryer has a first four pole motor that rotates a rotatable drum in the dryer through a transmission system. The clothes dryer has a second two pole self speed regulated induction motor connected to a blower fan in the air passageway of the dryer. The second motor rotates the fan to draw air out of the dryer and exhaust the air to an external vent. The second motor provides a long venting application and has a slip characteristic whereby the speed of the second motor automatically varies directly proportional to air flow restrictions associated with the external vent.

16 Claims, 4 Drawing Sheets

CLOTHES DRYER

FIELD OF THE INVENTION

The present invention relates to a clothes dryer and in particular to a clothes dryer adapted for use in long venting applications.

BACKGROUND OF THE INVENTION

In typical domestic clothes dryers, venting of exhaust air from the dryer is accomplished by a motor that drives both a blower fan and a transmission system that rotates the dryer drum. The dryer motor is typically a four pole induction motor which rotates at a speed of 1,800 revolutions per minute (rpm). The blower fan rotates to draw air from the dryer drum and forces the air out of the clothes dryer through an external vent mounted to an outlet port of the clothes dryer. The dryer motor is able to exhaust air from the dryer along the external vent for distances up to about 90 feet when there are no elbows or bends in the external vent. It should be understood that this exhaust venting may have bends and corners as it extends between the dryer outlet and a laundry room outlet vent. Also, further restrictions in this external vent may occur as a result of lint and dust build up inside the external vent.

In some new home applications, there is a requirement for the use of external vents that are longer in length than 90 feet and are upwards of 130 and 150 feet. These applications in the industry are referred to as long venting applications. Due to the longer length of these vents and the increased air flow restriction associated with pushing the air flow through a longer vent channel, the four pole motor connected directly to the blower fan does not generate sufficient air flow pressures to exhaust the dryer air along the longer vent channel.

There currently exists on the market a long vent clothes dryer adapted to operate with external vents extending to as much as 120 feet in length. This long vent clothes dryer incorporates a pulley transmission system that connects the blower fan with the four pole motor whereby the pulley transmission system effectively increases the speed of rotation of the blower fan and air pressure generated by the blower fan. While this system is believed to operate for external vent lengths up to 120 feet, in other applications lengths of 150 feet of external venting may be required.

Further, when a domestic major appliance manufacturer does not have a long venting clothes dryer solution, that manufacturer typically loses supplying a complete line of major appliances to new domestic housing projects requiring a long vent dryer application. In particular, the builder has a tendency to select the same line of appliances for all 5 or 6 major appliances provided in a home. When a long venting requirement must be met, the builder will usually order a complete line of major appliances from those manufactures with proven long venting clothes dryers.

Accordingly, there is a need to provide a clothes dryer which is suitable for use in a long venting application.

SUMMARY OF THE INVENTION

The present invention relates to a clothes dryer suitable for use in long venting applications. The clothes dryer of the present invention utilizes an independent second motor that is adapted to rotate a fan or blower to drive air from the dryer drum to an external vent. This second motor comprises a two pole self speed regulated induction motor. This two pole self speed regulated induction motor has a slip characteristic that results in the rotating speed of this motor automatically varying directly proportional to air flow restrictions associated with the external vent. That is, as air flow restrictions in the external vent increase, the speed of rotation of the two pole motor automatically speeds up without requiring any sophisticated variable speed controller being mounted to the second motor. The two pole motor at 60 hertz operating frequency has an ideal speed of 3300 rpm and the motor typically operates at this speed when there are very high restrictions in the external vent. However, when no restrictions in the air flow vent are present, the speed of this motor decreases to speeds of 1800 rpm.

The two pole motor operates to rotate the fan and push a required volume of air along the external vent that permits the clothes dryer to dry clothes contained in the drum. The motor achieves this by having its speed vary directly proportional to air flow restriction in the exhaust vent. The two pole motor slips and reduces speed as motor load increases. Motor load is greatest when the exhaust vent has no restrictions to air flow. Motor load reduces as restrictions to air flow in the exhaust vent increase. This is because the restrictions in the vent impede the movement of air that can be pushed by the fan through the vent. Consequently the two pole motor speeds up pushing the required volume of air along the exhaust vent to dry the clothes through a more restricted exhaust vent.

In accordance with the present invention there is provided a clothes dryer comprising a rotatable drum, a first motor, and a drum transmission connected between the first motor and the drum. The first motor is adapted to drive the drum transmission to rotate the drum. The clothes dryer has an air exhaust passageway for exhausting air from the drum out the dryer. The clothes dryer has a fan mounted in the air exhaust passageway for drawing air from the drum and exhausting air out of the dryer. The clothes dryer has a second motor that is adapted to rotate the fan. The second motor comprises a two pole self speed regulated induction motor.

In accordance with the present invention, there is provided a clothes dryer comprising a rotatable drum, a first motor, and a drum transmission connected between the first motor and the drum. The first motor is adapted to drive the drum transmission to rotate the drum. The clothes dryer has an air exhaust passageway for exhausting air from the drum out the dryer. The air exhaust passageway has an outlet port adapted for connection with an external vent. A fan is mounted in the air exhaust passageway for drawing air from the drum and exhausting the air out of the dryer and through the external vent. The clothes dryer has a second motor adapted to rotate the fan. The second motor has a slip characteristic whereby the speed of the second motor automatically varies directly proportional to air flow restrictions associated with the external vent.

By providing a second motor that has a slip characteristic where by its speed automatically varies directly proportional to air flow restrictions associated with the external vent, the present invention provides a clothes dryer suitable for long venting applications.

BRIEF DESCRIPTION OF THE DRAWINGS

For a better understanding of the nature and objects of the present invention reference may be had to the following detailed description when taken in conjunction with the accompanying electrical diagrammatic drawings wherein.

DETAILED DESCRIPTION OF THE INVENTION

Figure 1:
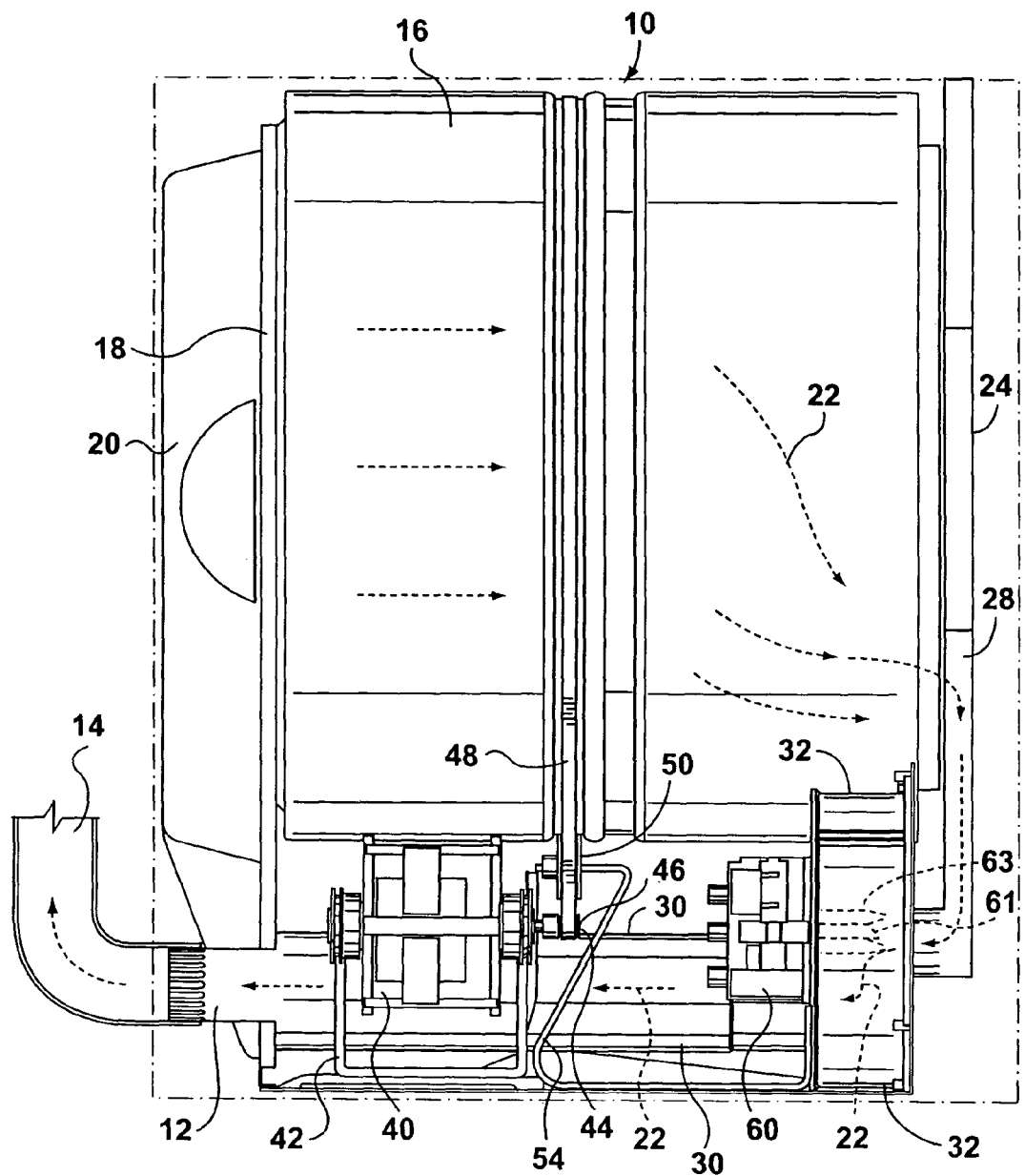
FIG. 1 is a side view of the inside of the clothes dryer of the present invention.
Figure 2:
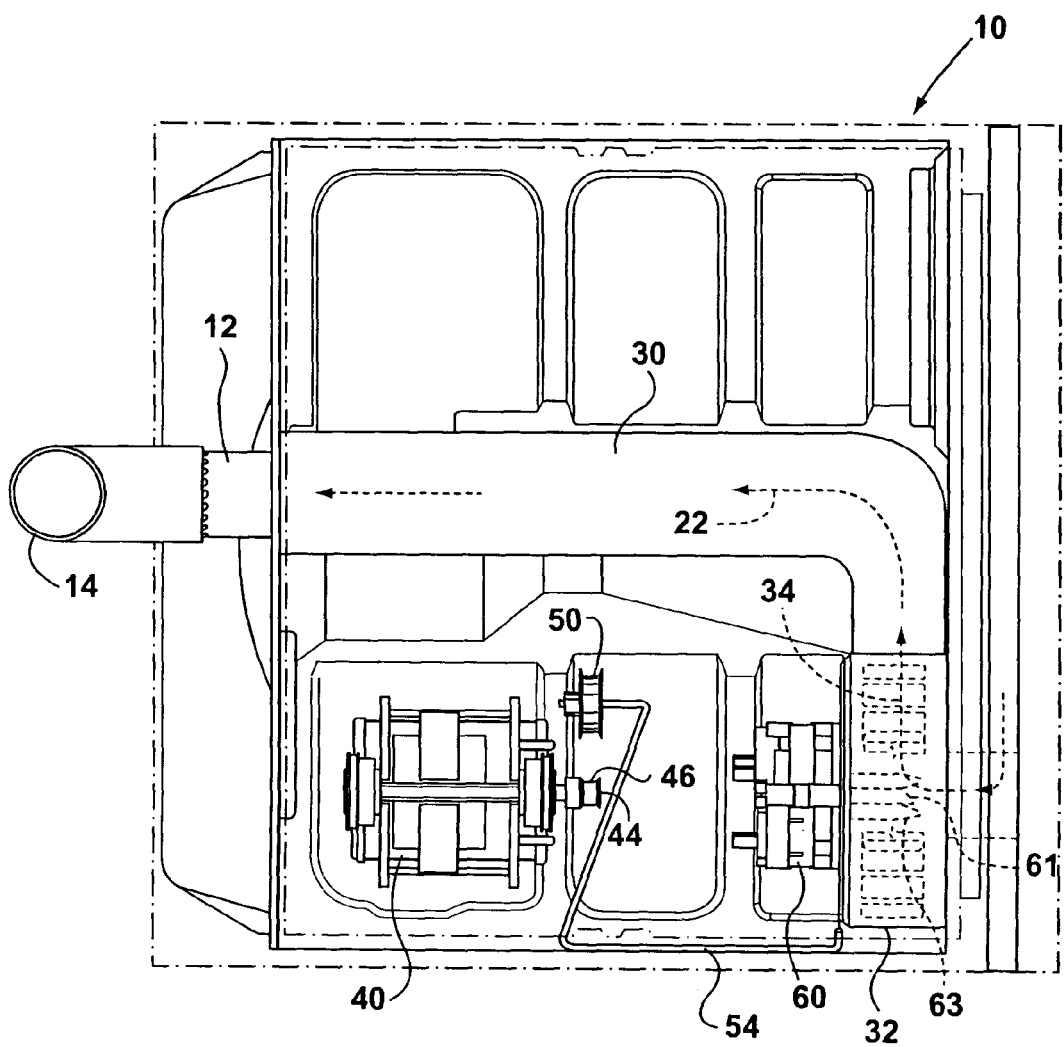
FIG. 2 is a plan view of the inside of the clothes dryer with the rotating drum removed.
Figure 3:
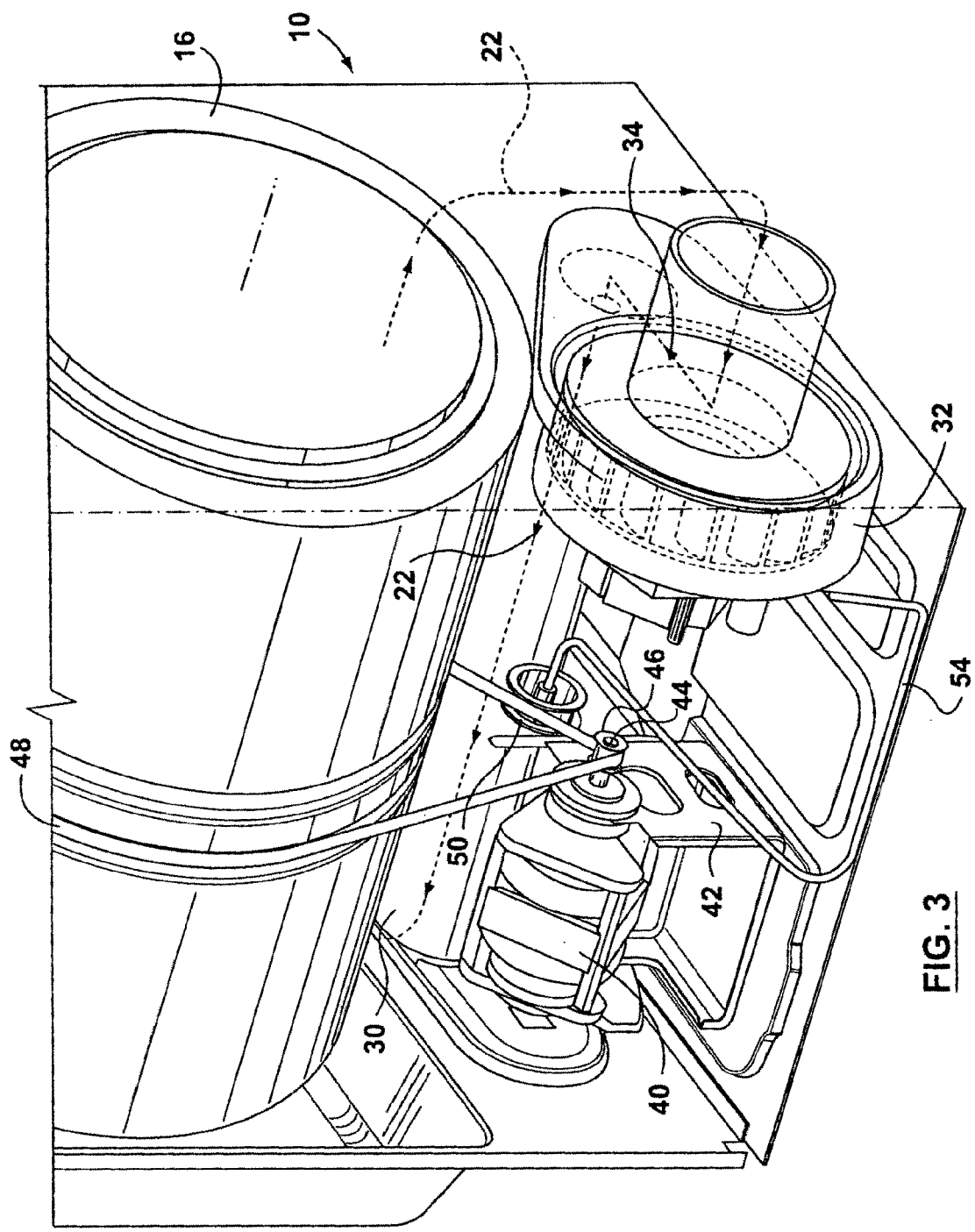
FIG. 3 is perspective view of the inside of a clothes dryer.

The present invention relates to a clothes dryer suitable for use in long venting applications. Referring to FIGS. 1 through 3 there is shown a clothes dryer 10 having an exhaust outlet port vent 12 adapted to be connected to an external vent 14. For the purposes of the illustration, only a small length of the external vent 14 is shown, however it should be understood that in long venting applications this vent 14 may extend for lengths beyond 90 feet and upwards to 150 feet for straight away external vents.

The clothes dryer 10 is shown to comprise a rotatable drum 16. Air flows in the rear panel 18 of the rotatable drum passing through a heater assembly 20. The heater assembly 20 in one embodiment comprises an electrical heating assembly whereby the air flows through the assembly through a diffuser wall and into the rotating drum 16. It should be understood that in alternative embodiments, the heating may be accomplished by a gas flame and also that the rear wall 18 of the dryer drum 16 adjacent the heating assembly 20 may comprise a stationary non-rotating wall.

Air flows through the dryer drum 16 as shown by arrows 22 to remove moisture from clothing and other articles (not shown) contained within the drum 16. The drum 16 has a front door 24 that is adapted to open and allow access into the drum. Air flow occurs through the front of the drum and out through a filter (not shown). The air flows through the front air trap duct 28 of the dryer and along air flow ducting or passageway 30 to the outlet port 12. As the air flows along air flow passageway 30, it passes tangentially out through blower wheel or fan 32. In other words, the air is drawn axially inwardly to the center of the fan blades 32 and then radially out through the fan 32 as indicated by arrows 34 extending along the axis of the fan 32.

Rotation of the drum 16 is controlled by a four pole motor 40 mounted on bracket 42. The four pole motor 40 rotates at approximately 1,800 rpm in a 60 hertz 120 volt supply grid. The motor 40 has a first shaft 44 around which a pulley 46 is mounted. The pulley 46 forms part of the transmission system for rotating the drum 16. The transmission system 46 further includes an endless belt 48 which passes around the outer periphery of drum 16 and around the pulley 44. The pulley 44 in effect drives the belt 48 around the drum 16. In order to maintain the belt 48 in tension or friction against the outer surface periphery of drum 16, an Idler pulley 50 is held in tension against the belt 48 by means of a cantilevered spring arm 54. For more description on the manner in which the cantilever arm 54 and Idler pulley 50 maintain tension on the endless belt 48, reference may be made to U.S. Pat. No. 4,300,293 issued Nov. 17, 1981 to Victor Gladysz.

In accordance with the present invention, the dryer further includes a second motor 60. The second motor 60 has its shaft 61 directly connected to a center hub 63 of the blower fan 32 so as to rotate the blower fan 32 independently of the rotation of the rotatable drum 16. The motor 60 comprises a two pole induction motor that has a slip characteristic which results in the motor having a self regulating variable speed operation that varies proportional to air flow restrictions found in or along the external vent 14 as a result of lint build up or bends and elbows in the vent.

Figure 4:
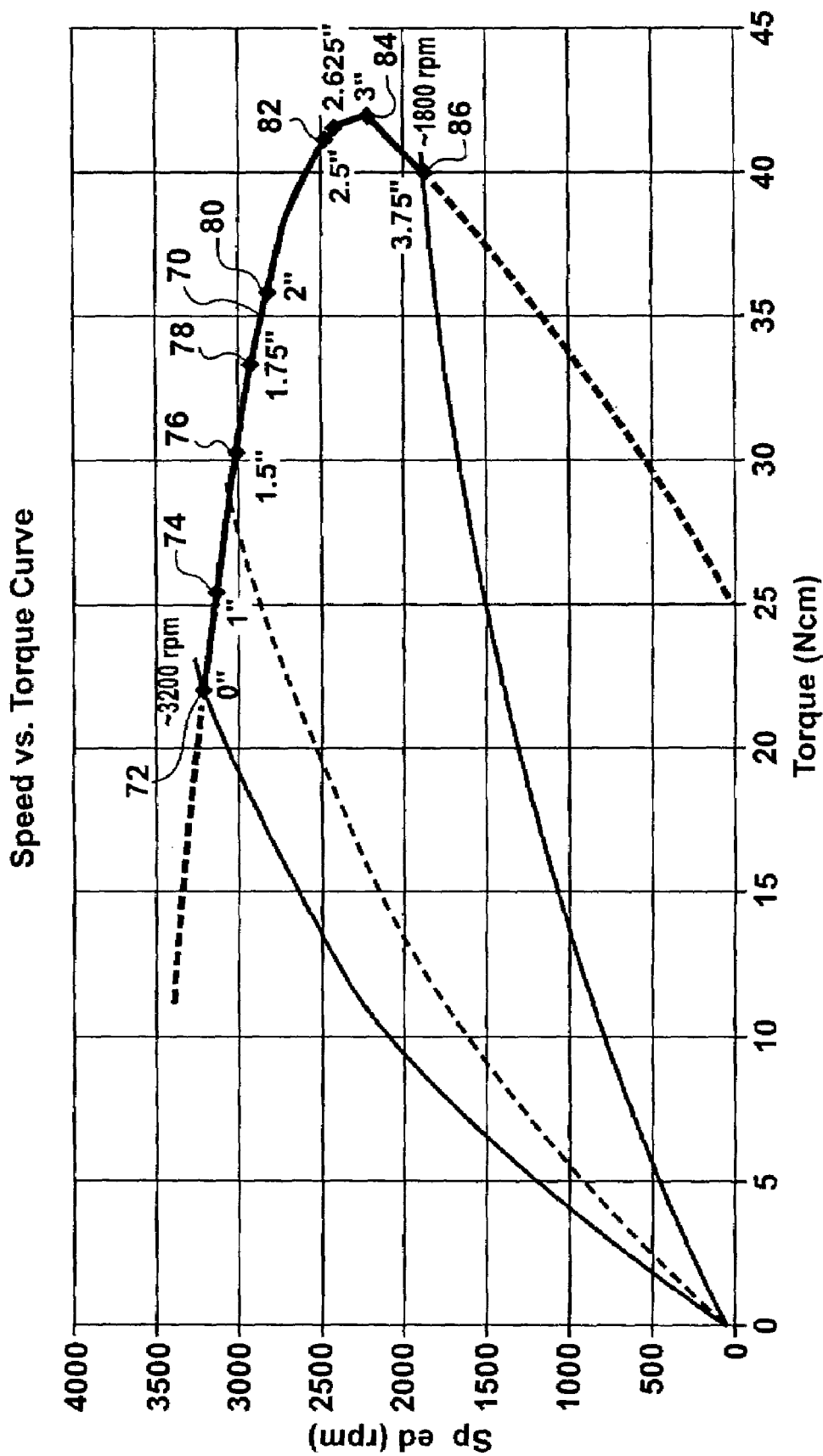
FIG. 4 is a graph of Speed vs. Torque for the blower motor of the present invention for varying restrictions in the air flow.

Referring to FIG. 4, there is shown a graph of speed in rpm vs. torque in Newton centimeters (Ncm) where the operating characteristics of the two pole induction motor 60 of the present invention are shown at curve 70. This operating curve 70 is plotted for air flow restrictions between 0 inches of restriction at 72, 1 inch at 74, 1.5 inches at 76, 1.75 inches at 78, 2 inches at 80, 2.5 inches at 82, 3 inches at 84 and 3.75 inches at 86. At point 86, for 3.75 inches in air flow restriction, the rpm speed of the motor is 1800. For a 0 inches in restrictions, that is the amount of air that can be moved through the pipe is very low, the rpm speed of the motor is 3200. The graph shows that the speed of the motor 60 decreases as the air flow restrictions in the vent 14 decrease. It should be understood that the inches of air flow restriction of FIG. 4 are relative to a clean open pipe having a four inch diameter. Accordingly, for point 86 the vent has almost no restrictions and the amount of air that can be moved along the pipe is high. Consequently the motor 60 speed is at its low range of 1800 rpm.

In one embodiment the two pole motor is a Bosch induction motor, model no.165D523P002. In another embodiment this motor has been modified by to improve operation by machining the end ring to reduce its height by 1.0 mm within 0.1 mm whereby the diameter of the end ring is changed from 28.5 mm to 36.0 mm within 1.0 mm.

Accordingly, the present invention provides for the use of a second two pole induction motor that has a slip characteristic whereby the motor can slip in speed range between 3200 rpm and 1800 rpm. It is advantageous that the motor not operate at speeds in excess of 3200 rpm as speeds above this may result in the clothes tumbled in the dryer not being properly dried because the air is drawn too quickly through the dryer drum. Further, it is important that speeds of 1800 rpm be maintained so as to adequately push the air flow through the clothes dryer, when there is no restriction to air flow and the load associated with air to be pushed through the vent is high, and not result in excessive temperature rises within the clothes dryer which would result in the clothes dryer turning off the heating devices and extending the length of time that it would take to dry clothes within the clothes dryer.

While the invention has been described in connection with what is presently considered to be practical embodiments, it is to be understood that the invention is not to be limited thereto, but on the contrary, is intended to cover various modifications and equivalent arrangements that fall within the spirit and scope of the appended claims.

What is claimed is:

1. A clothes dryer comprising:

a rotatable drum;

a first motor;

a drum transmission connected between the first motor and the drum, the first motor adapted to drive the drum transmission to rotate the drum;

an air exhaust passageway for exhausting air from the drum out the dryer;

a fan mounted in the air exhaust passageway for drawing air from the drum and exhausting air out of the dryer and through an external vent; and a second motor adapted to rotate the fan, and the second motor comprising a two pole self speed regulated induction motor whereby the speed of the second motor automatically varies directly proportional to air flow restrictions associated with the external vent.

2. The clothes dryer of claim 1 wherein the first motor includes a first shaft and the drum transmission comprises a first pulley mounted to the first shaft and a continuous belt extending around the first pulley and the dryer drum.

3. The clothes dryer of claim 2 wherein the drum transmission further includes an idler pulley adapted to engage the endless belt and maintain the endless belt in tension about the dryer drum and the first pulley.

4. The clothes dryer of claim 1 wherein the fan comprises a tangential fan having an axis of rotation adapted to draw air towards the axis of rotation and then radially out from the fan, and the second motor has a second shaft adapted to connect with the fan and rotate the fan about its axis of rotation.

5. The clothes dryer of claim 1 wherein the first motor is a four pole induction motor.

6. The clothes dryer of claim 1 wherein the second motor has a second shaft connected directly to the center hubs of the fan to rotate the fan.

7. A clothes dryer comprising:
a rotatable drum;
a first motor;
a drum transmission connected between the first motor and the drum, the first motor adapted to drive the drum transmission to rotate the drum;
an air exhaust passageway for exhausting air from the drum out the dryer;
a fan mounted in the air exhaust passageway for drawing air from the drum and exhausting air out of the dryer; and
a second motor adapted to rotate the fan, and the second motor comprising a two pole self speed regulated induction motor having a variable speed in the range of 3300 rpm to 1800 rpm where the speed range is directly proportional to air flow restrictions of between 0 and 4 inches in diameter in an exhaust vent of 4 inches in diameter.

8. A clothes dryer comprising:
a rotatable drum;
a first motor;
a drum transmission connected between the first motor and the drum, the first motor adapted to drive the drum transmission to rotate the drum;
an air exhaust passageway for exhausting air from the drum out the dryer, the air exhaust passageway having an outlet port adapted for connection with an external vent;
a fan mounted in the air exhaust passageway for drawing air from the drum and exhausting air out of the dryer and through the external vent; and
a second motor adapted to rotate the fan, and the second motor having a slip characteristic whereby the speed of the second motor automatically varies directly proportional to air flow restrictions associated with the external vent.

9. The clothes dryer of claim 8 wherein the second motor is a two pole motor.

10. The clothes dryer of claim 8 wherein the first motor includes a first shaft and the drum transmission comprises a first pulley mounted to the first shaft and a continuous belt extending around the first pulley and the dryer drum.

11. The clothes dryer of claim 10 wherein the drum transmission further includes an idler pulley adapted to engage the endless belt and maintain the endless belt in tension about the dryer drum and the first pulley.

12. The clothes dryer of claim 8 wherein the fan comprises a tangential fan having an axis of rotation adapted to draw air towards the axis of rotation and then radially out from the fan, and the second motor has a second shaft adapted to connect with the fan and rotate the fan about its axis of rotation.

13. The clothes dryer of claim 8 wherein the first motor is a four pole induction motor.

14. The clothes dryer of claim 8 wherein the second motor is a two pole induction motor having a variable speed in the range of 3300 rpm to 1800 rpm.

15. The clothes dryer of claim 14 wherein the speed range is directly proportional to air flow restrictions of between 0 and 4 inches in diameter in an exhaust vent of 4 inches in diameter.

16. The clothes dryer of claim 8 wherein the second motor has a second shaft connected directly to the center hubs of the fan to rotate the fan.

* * * * *